United States Patent [19]

Karita et al.

[11] Patent Number: 4,954,914

[45] Date of Patent: Sep. 4, 1990

[54] APPARATUS FOR READING AN IMAGE

[75] Inventors: Toshiaki Karita, Sakurai; Takashi Watanabe, Nara, both of Japan

[73] Assignee: Sharp Kabushiki Kaisha, Osaka, Japan

[21] Appl. No.: 279,420

[22] Filed: Dec. 2, 1988

[30] Foreign Application Priority Data

Dec. 2, 1987 [JP] Japan .................................. 62-306645

[51] Int. Cl.$^5$ ............................................... H04N 1/04
[52] U.S. Cl. .................................................... 358/475
[58] Field of Search .......................................... 358/475

[56] References Cited

U.S. PATENT DOCUMENTS 4,408,231 10/1983 Bushaw et al. ...................... 358/475

Primary Examiner—Edward L. Coles, Sr.
Attorney, Agent, or Firm—Irell & Manella

[57] ABSTRACT

An apparatus for reading an image from a document which comprises a light emitting means having a plurality of LEDs, a back plate disposed in the vicinity of a region in which the document is to be irradiated, an optical sensor, an adjust means which changes the output level of each LEDs, and a control means which controls the adjust means in such a manner that the output level of each of the LEDs is equal to each other, in response to the output signals of the optical sensor which are obtained from light beams reflected from the back plate when no document is in the region. In the apparatus, the document can be irradiated uniformly by the LEDs.

7 Claims, 2 Drawing Sheets

APPARATUS FOR READING AN IMAGE

BACKGROUND OF THE INVENTION

1. Field of the Invention

This invention relates to an apparatus for reading an image from a document, more particularly to a image sensor which can be used for example as a scanner of a facsimile.

2. Description of the Prior Art

In a scanner of a facsimile, a light emitting diode array (hereinafter, referred as "an LED array") which consists of a plurality of LEDs is generally used for irradiating a document which is moved along a path. Light beams reflected from the document are incident on an optical sensor which produces analog signals the level of which corresponds to the tone of an image on the document. The analog signals are converted into binary coded signals by an A/D converter and supplied as image signals to an image processor.

Generally, it is difficult to manufacture LEDs so as to make their optical output properties equal to each other. In most cases, therefore, an LED array has a drawback that it cannot irradiate the document uniformly. This causes the output signals of the optical sensor to be distorted so that the slice level of the binary coded signals output from the A/D converter fluctuates, resulting in uneven levels of the image signals which are obtained from images having the same tone.

In order to solve the above-mentioned problem, as shown in FIG. 2, a conventional image sensor is provided with a line memory 12 which stores digital signals supplied from an A/D converter 11, and a D/A converter 13 which converts the digital data obtained from the memory 12 into analog signals. The output signals of the D/A converter 13 are supplied as a slice level signal to the A/D converter 11.

More particularly, an LED array 16 irradiates a back plate 15 before a document 14 has moved to an irradiation region r. The light beams reflected from the back plate 15 are converted by an optical sensor 17 into electric signals which are then converted into digital signals by the A/D converter 11. The digital signals are stored in the line memory 12 as "white" information. After the document 14 has reached the region r, the light beams reflected from the document 14 are converted by the optical sensor 17 into electric signals, and the "white" information is supplied from the memory 12 to the A/D converter through the D/A converter 13, as a corrected slice level. The A/D converter 11 compares the levels of the electric signals with the corrected slice level and outputs binary coded signals as image signals.

In such a conventional image reader, however, the uneven output levels of the LEDs of the LED array 16 are not corrected, and, hence, the document 14 is unevenly irradiated by the LED array. The correction of the slice level of the A/D converter 11 is not sufficient to positively eliminate the unevenness of image signals. In other words, a conventional image sensor has a problem in that the S/N ratios of the binary coded signals are uneven.

In the conventional image reader of FIG. 2, moreover, expensive components such as the line memory 12 and the D/A converter 13 are necessary, resulting in a high manufacturing cost of the image sensor.

SUMMARY OF THE INVENTION

The apparatus for reading an image from a document of this invention, which overcomes the above-discussed and numerous other disadvantages and deficiencies of the prior art, comprises a light emitting means which has a plurality of light emitting devices; a back plate disposed in the vicinity of a region in which the document is to be irradiated; an optical sensor means which produces signals the level of each of which corresponds to the level of light beams which have been reflected from said document or back plate and are incident on said light sensor means; an adjust means which changes the output level of each of or each group of said light emitting devices; and a control means which controls said adjust means in such a manner that the output levels of said light emitting devices are substantially equal to each other, in response to said output signals of said optical sensor means which are obtained from light beams reflected from said back plate when no document is in said region.

In a preferred embodiment, the control means comprises an A/D converter which converts said signals of said optical sensor means into digital signals, and said control means controls said adjust means in response to said digital signals.

In a preferred embodiment, the A/D converter produces binary coded signals from said signals of said optical sensor means, for reading an image.

In a preferred embodiment, each of the light emitting devices has a light emitting diode.

In a preferred embodiment, the adjust means are variable resistors which are respectively connected to said light emitting diode of each of said light emitting devices.

In a preferred embodiment, each of the light emitting devices has a group of light emitting diodes.

In a preferred embodiment, the adjust means are variable resistors which are respectively connected to said group of light emitting diodes of each of said light emitting devices.

Thus, the invention described herein makes possible the objectives of (1) providing an apparatus for reading an image which can surely correct the unevenness of image signals; (2) providing an apparatus for reading an image in which a document can be evenly irradiated; (3) providing an apparatus for reading an image in which output levels of light emitting devices such as LEDs can be easily corrected so as to be equal to each other; and (4) providing an apparatus for reading an image which eliminates the necessity of expensive components.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
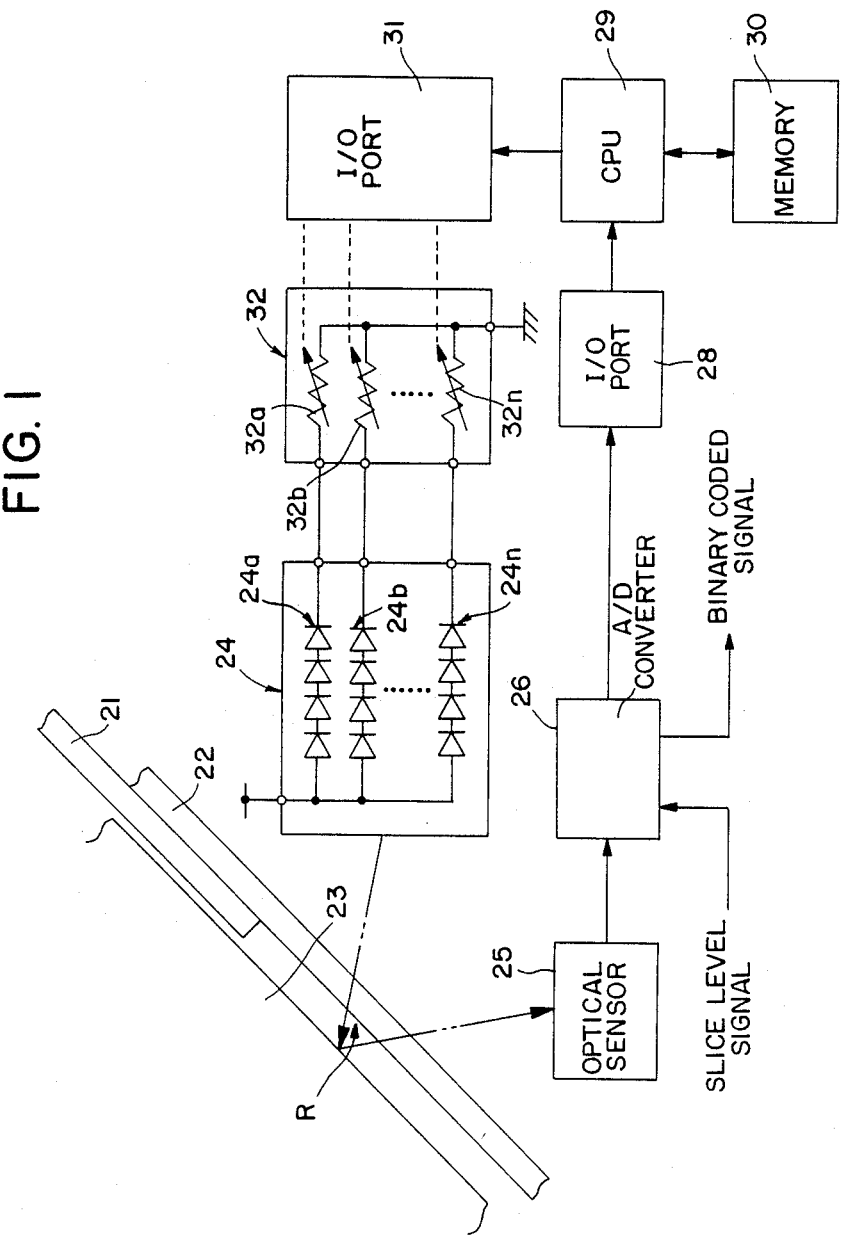
FIG. 1 is a block diagram illustrating an apparatus for reading an image according to the invention.
Figure 2:
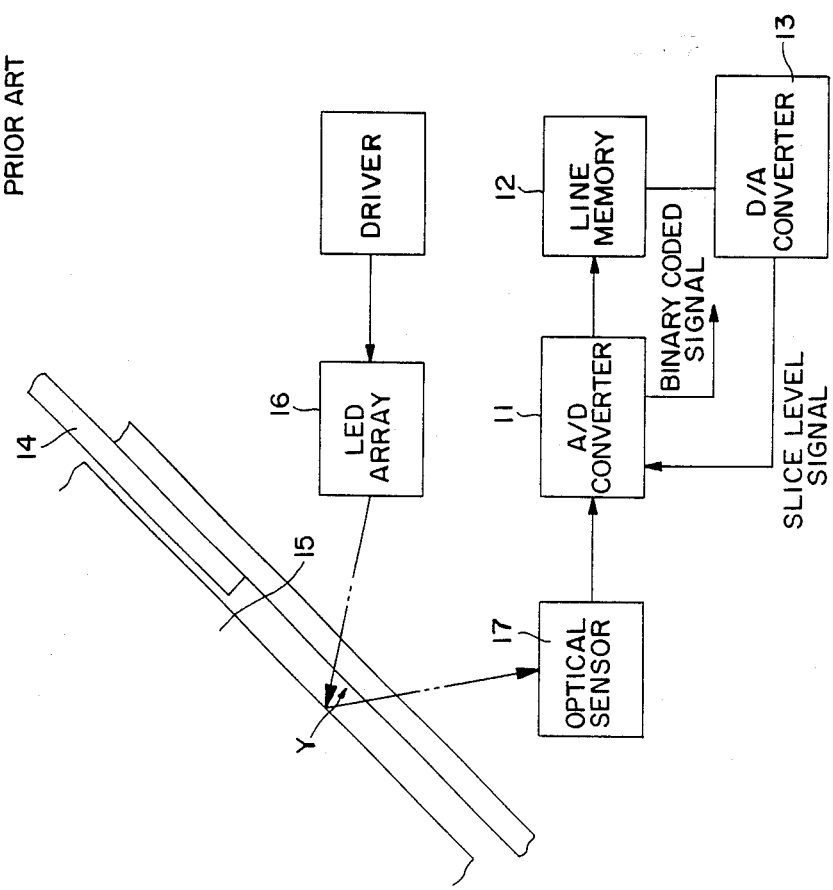
FIG. 2 is a block diagram illustrating an apparatus for reading an image of the prior art.

FIG. 1 shows an apparatus for reading an image according to the invention. The apparatus of FIG. 1 is an image sensor used as a scanner of a facsimile, and comprises a glass plate 22 and a back plate 23. A document 21 to be read is moved in a path between the glass plate 22 and the back plate 23. In the vicinity of a region R in the path, an LED array 24 and an optical sensor 25 are disposed. The LED array 24 comprises LED groups 24a to 24n in each of which a plurality of LEDs are connected in series. The light beams of the LED groups 24a to 24n are reflected by the document 21 when it is in the region R or by the back plate 23 when the document 21 is not in the region R, and then incident on the optical sensor 25. The optical sensor 25 may be a contact-type sensor or a CCD, and produces output signals the level of which corresponds to the level of the light beam incident thereon.

The output signals of the optical sensor 25 are supplied to an A/D converter 26 which compares the output signals of the optical sensor 25 with a slice level signal, to produce binary coded signals as image signals for image processing. In the image sensor of FIG. 1, the slice level signal is supplied from an adequate process means. The A/D converter 26 also coverts the output signals of the optical sensor 25 into digital signals which are then supplied to an I/O port 28.

The digital signals are supplied to a CPU 29 via the I/O port 28. A memory 30 and another I/O port 31 are connected to the CPU 29. In the memory 30, a table indicating the relations between the optical output levels of the LED groups 24a to 24n and the driving currents applied to the LED groups is previously stored.

The I/O port 31 is connected to a resistance adjusting device 32 having variable resistors 32a to 32n. One end of the resistors 32a to 32n is connected to the cathode terminal of the LED groups 24a to 24n, respectively. The resistance of the resistors 32a to 32n can be independently adjusted by control signals supplied from the I/O port 31. When the resistance of one of the resistors 32a to 32n (e.g., 32a) is to be changed, the level of the driving current applied to the corresponding LED group (e.g., 24a) is adjusted to vary the optical output level of the LED group.

The operation of the apparatus of FIG. 1 will be described. When the operation of reading an image from the document 21 is commenced and the document 21 is not yet moved to the region R, each of the LED groups 24a to 24n is driven by a driving current the level of which is defined by the resistance of the corresponding one of the resistors 32a to 32n. The light beams emitted from the LED groups 24a to 24n are reflected by the back plate 23 and then are incident on the optical sensor 25 which outputs analog signals in response to the light beams impinged thereon. The level of each analog signal respectively corresponds to each incident light beams from the LED groups 24a to 24n.

The analog signals of the optical sensor 25 are converted into digital signals which are supplied to the CPU 29 via the I/O port 28. The CPU 29 calculates the resistance of each resistors 32a to 32n in accordance with the digital signals and the table stored in the memory 30, so that the optical output level of each LED groups 24a to 24n becomes equal to each other. According to the calculated resistances, the I/O port 31 controls the resistances of the variable resistors 32a to 32n, to change the levels of the driving currents of the LED groups 24a to 24n, so that the optical output levels of the LED groups become even.

After the document 21 has reached the region R, the document 21 is irradiated with the light beams of the LED groups 24a to 24n (the levels of which have been adjusted to be even, as described above). The light beams of the LED groups 24a to 24n are reflected by the document 21, and thereafter impinge on the optical sensor 25, to be converted into analog signals. The analog signals are transmitted to the A/D converter 26. The A/D converter 26 compares the analog signals with the slice level signal, and produces binary coded signals which are processed by another process means for image processing.

As mentioned above, the optical output levels of the LED groups 24a to 24n are controlled so as to be uniform. Hence, the document 21 is irradiated uniformly by the light beams emitted from the LED groups 24a to 24n. The S/N ratio of the binary coded signals output from the A/D converter 26 can be surely kept even, resulting in that the tone of an image on the document 21 can be read out evenly. As apparent from the above, it is not necessary to change the level of the slice level signal supplied to the A/D converter 26.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An apparatus for reading an image from a document, comprising:
   a light emitting means which has a plurality of light emitting device;
   a back plate disposed in the vicinity of a region in which the document is to be irradiated;
   an optical sensor means which produces output signals, the level of each of which corresponds to the level of light beams which have been reflected from said document or back plate and are incident on said optical sensor means;
   an adjust means which changes the output level of each of or each group of said light emitting devices; and
   a control means which controls said adjust means in such a manner that the output levels of said light emitting devices are substantially equal to each other, in response to said output signals of said optical sensor means which are obtained from light beams reflected from said back plate when no document is in said region.

2. An apparatus according to claim 1, wherein said control means comprises an A/D converter which converts said signal of said optical sensor means into digital signals, and said control means controls said adjust means in response to said digital signals.

3. An apparatus according to claim 1, wherein said A/D converter produces two-value signals from said signal of said optical sensor means, for reading an image.

4. An apparatus according to claim 1, wherein each of said light emitting devices has a light emitting diode.

5. An apparatus according to claim 4, wherein said adjust means are variable resistors which are respectively connected to said light emitting diode of each of said light emitting devices.

6. An apparatus according to claim 1, wherein each of said light emitting devices has a group of light emitting diodes.

7. An apparatus according to claim 6, wherein said adjust means are variable resistors which are respectively connected to said group of light emitting diodes of each of said light emitting devices.

* * * * *